Feb. 20, 1968
E. K. VON FANGE
3,370,211
VARIABLE CAPACITORS
Filed July 15, 1966
2 Sheets-Sheet 1
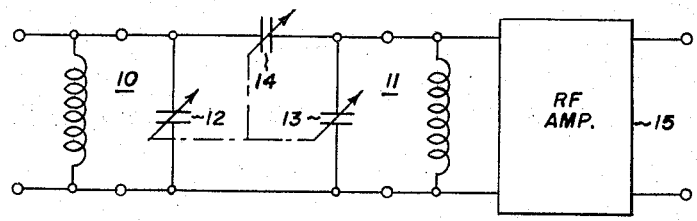
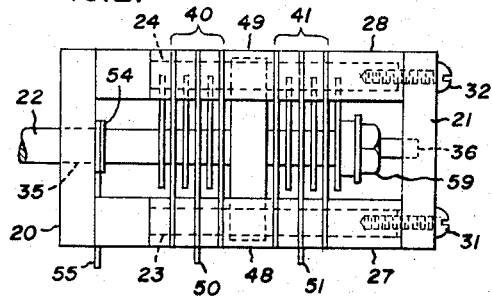
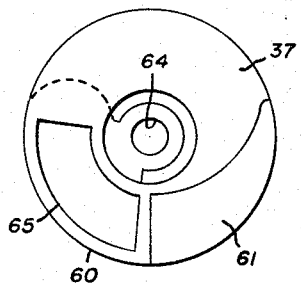
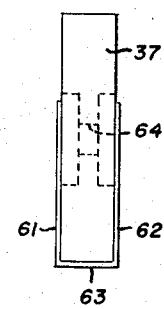
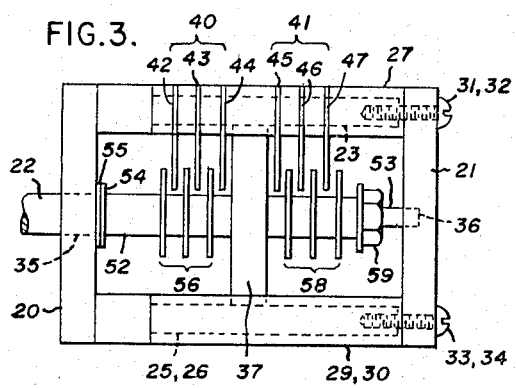
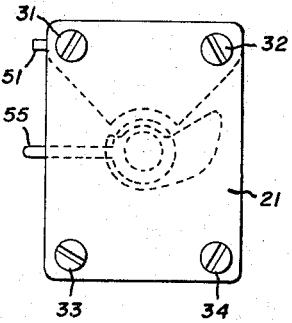
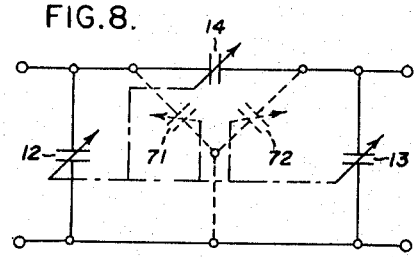
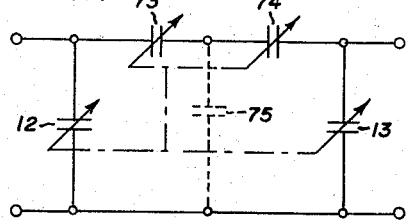
INVENTOR:
EUGENE K. Von FANGE,
BY
HIS ATTORNEY.

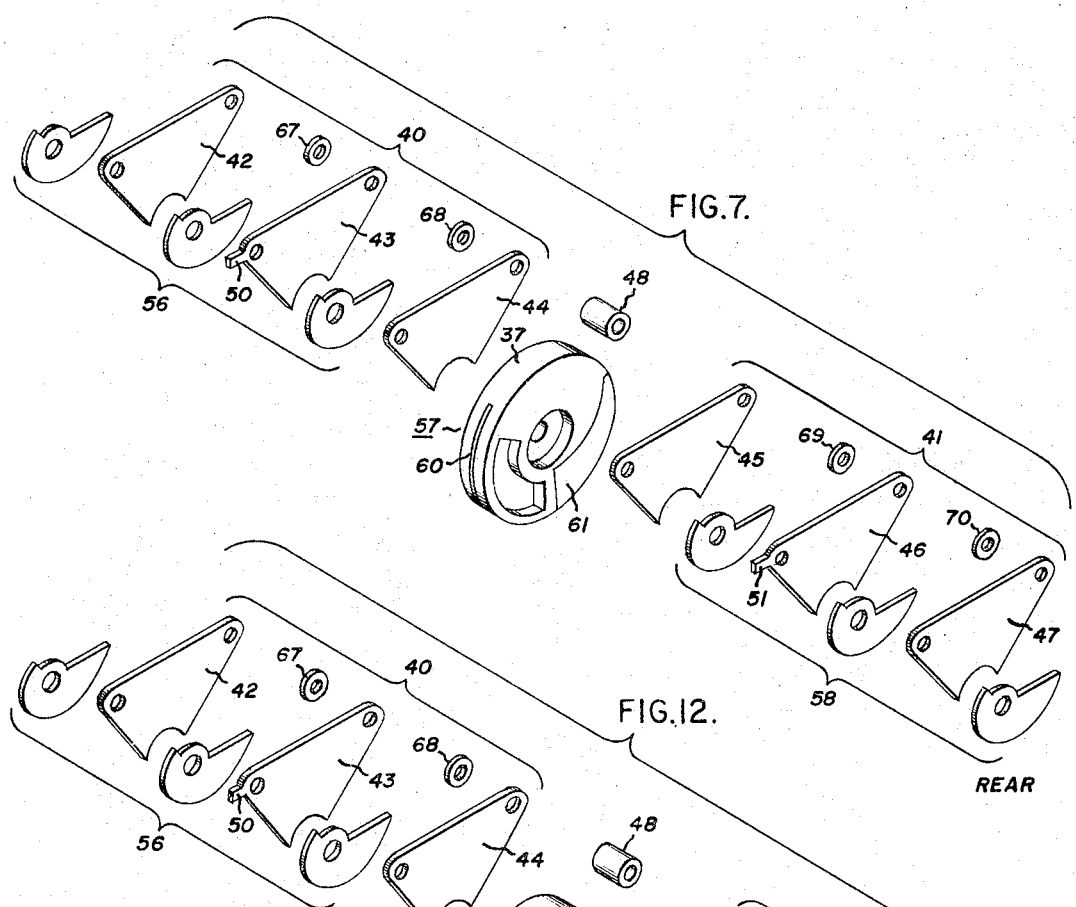
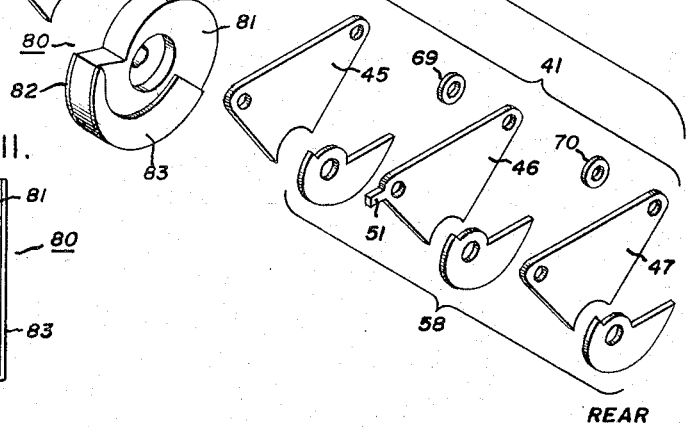
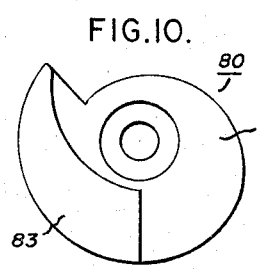
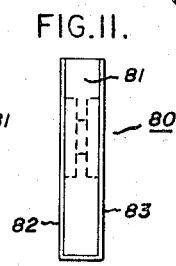
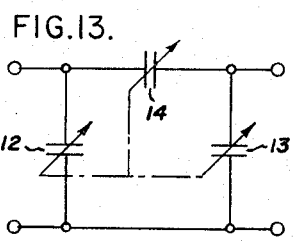

United States Patent Office 3,370,211
Patented Feb. 20, 1968

3,370,211
VARIABLE CAPACITORS
Eugene K. Von Fange, Syracuse, N.Y., assignor to General Electric Company, a corporation of New York
Filed July 15, 1966, Ser. No. 565,570
5 Claims. (Cl. 317—254)

ABSTRACT OF THE DISCLOSURE

A variable capacitor comprises a set of fixed conductive plates mounted in a frame member, a set of rotatable conductive plates appropriately mounted on a shaft so as to interleave with the fixed conductive plates, and a dielectric member mounted on the shaft and supporting an opposing pair of sector-shaped conductive plates. The opposing pair of sector-shaped conductive plates are conductively connected and are mounted along the peripheries of the bases of a cylindrical member so as to interleave with adjacent stator plates. The cylindrical member may also serve as a mounting means for an additional sector-shaped conductive plate which serves as a shield between adjacent plates of the stator.

The present invention relates in general to variable capacitors and more particularly relates to arrangements of a plurality of such capacitors each having a stator assembly and a rotor assembly, the latter of which are mounted on a common shaft or mechanically coupled so as to permit concurrent variation of the capacitance thereof with rotation of the shaft, and in addition means for concurrently varying the coupling between the stator plates of any two of the variable capacitors.

Such ganged variable capacitors are useful in double tuned circuits used in the television art for selecting bands of frequencies for processing by the television receiver, and are particularly useful in such circuits in which the tuned circuits are not only capacitively tuned but also are coupled by a capacitor which is required to be variable. Such circuits are disclosed and claimed in a copending application Serial No. 595,569, filed July 15, 1966, and assigned to the assignee of the present invention.

The present invention is directed towards providing simple, economical, high performance, variable coupling capacitor structures.

The present invention is particularly directed to providing such a structure suitable for integration in ganged variable capacitors of the character described above.

The novel features believed characteristic of the invention are set forth in the appended claims. The invention itself, together with further objects and advantages thereof, may best be understood by reference to the following description taken in connection with the accompanying drawings in which:

FIGURE 1 shows a schematic diagram partly in block form of a circuit in which the variable capacitor structure of the present invention may be used.

FIGURE 2 shows a top or plan view of a structure including three variable capacitors all simultaneously variable by movement of a single shaft in accordance with one embodiment of the present invention.

FIGURE 3 is a front view of the structure of FIGURE 2.

FIGURE 4 is a side or end view of the structure of FIGURE 3.

FIGURE 5 is a plan view of the rotor of the variable coupling capacitor of the composite variable capacitor structure of FIGURES 2, 3 and 4.

FIGURE 6 is a side view of the rotor structure of FIGURE 5.

FIGURE 7 is an exploded view in perspective of the stator and rotor elements of the variable capacitor structure of FIGURES 2, 3 and 4 showing the relationship between the rotor and stator elements of the various capacitors thereof with the rotor elements being set for a capacitance value in the middle of the range of capacitances thereof.

FIGURE 8 is a schematic representation of the equivalent circuit formed by the composite structure of FIGURES 2, 3 and 4 when the central rotor plate of FIGURE 7 is positioned in the low capacitance range thereof.

FIGURE 9 is a schematic representation of the equivalent circuit of the composite capacitor structure of FIGURES 2, 3 and 4 when the central rotor plate of FIGURE 7 is positioned in the high capacitance range thereof.

FIGURE 10 shows a plan view of another rotor suitable for use in the composite capacitor structure of FIGURES 2, 3 and 4.

FIGURE 11 shows a side view of the rotor structure of FIGURE 10.

FIGURE 12 is an exploded view in perspective of the stator and rotor elements of the variable capacitor structure of FIGURES 2, 3 and 4 using the central rotor plate of FIGURE 10 and showing the relationship between the rotor and stator elements of the various capacitors thereof with the rotor elements being set for a capacitance value in the middle of the range of capacitances thereof.

FIGURE 13 is a schematic representation of the equivalent circuit formed by the composite structure of FIGURES 2, 3 and 4 with rotor plate of FIGURE 10 when the central rotor plate is positioned in the low capacitance range thereof.

Referring now to FIGURE 1 there is shown a simplified diagram partly in schematic form and partly in block form of part of the R.F. (radio frequency) or tuner portion of a television receiver. The circuit includes a pair of tuned circuits 10 and 11 each tuned by respective variable capacitors 12 and 13 and mutually coupled by means of a third variable capacitor 14. Input signals are applied to the primary circuit 10 and output signals are applied from the secondary circuit 11 to an R.F. amplifier 15. The capacitors are mechanically ganged together and are varied simultaneously to tune the doubly tuned resonsant circuits to pass the desired band of frequencies applied to the primary circuit.

Current design practice in the tuner portion of a television receiver for the VHF range of frequencies involves the use of inductance as the variable element of the tuned circuits. In a copending application Serial No. 545,569, filed July 15, 1966, and assigned to the assignee of the present invention double tuned circuits particularly adapted for television tuners are described and claimed in which the capacitance elements of the tuned circuits are utilized as the variable elements. One of the requirements for obtaining the desired and necessary constant bandwidth response from the double tuned circuit so tuned is that the coupling capacitance coupling the primary and secondary circuits vary in a prescribed manner with the variation of capacitance of the primary and secondary tuned circuits. Accordingly, for the operation of the circuit at least three variable capacitors are required. It would, of course, be appreciated that other circuit elements in addition to those shown in FIGURE 1 are necessary as more particularly pointed out in the above mentioned patent application Serial No. 595,569. For the circuits particularly described in the aforementioned patent application (which include shunt inductances connected in the high VHF channels) typical capacitance requirements of the primary variable capacitor 12, the secondary variable capacitor 13 and the coupling capacitor 14 are set forth therein and also below in Table I.

TABLE I

| VHF Channel | Center Freq. ($f_o$) | $C_{12}, C_{13}$ (pf.) | $C_{14}$ (pf.) |
|---|---|---|---|
| 2 | 57 | 24.5 | 3.7 |
| 3 | 63 | 20.1 | 2.7 |
| 4 | 69 | 16.7 | 2.1 |
| 5 | 79 | 12.7 | 1.4 |
| 6 | 85 | 11.0 | 1.1 |
| 7 | 177 | 10.15 | 0.49 |
| 8 | 183 | 9.5 | 0.44 |
| 9 | 189 | 8.9 | 0.4 |
| 10 | 195 | 8.35 | 0.36 |
| 11 | 201 | 7.87 | 0.33 |
| 12 | 207 | 7.4 | 0.30 |
| 13 | 213 | 7.0 | 0.28 |

Column one sets forth the VHF channel. Column two sets forth the center frequencies of the various channels of column one. Column three sets forth the value of the tuning capacitances 12 and 13 in picofarads for the various center frequencies of column two. Column four sets forth the value of coupling capacitance 14 in picofarads required for the various channels of operation of column one.

It will be noted from Table I that the capacitance requirements vary from 7 picofarads for channel 13 operation at 213 megacycles center frequency, to 24.5 picofarads for channel 2 operation at 57 megacycles center frequency. The secondary capacitance requirements are approximately the same as for the primary capacitance. The coupling capacitance requirements vary from 0.28 picofarad to 3.7 picofarads.

The present invention is directed to a unitary, yet simple, structure for providing such three variable capacitors mechanically ganged together for enabling the desired range of variable capacitances to be obtained in the primary and secondary tuned capacitances and the wide range variation in the coupling capacitance, as will be more apparent as the description proceeds.

Referring now to FIGURES 2, 3 and 4 there are shown plan, front and side views respectively, of the unitary variable capacitor structure in which are included three variable capacitors in accordance with one embodiment of the present invention. The structure includes front and rear end frame members 20 and 21 adapted to be secured in opposed relationship with respect to one another, and a shaft 22 rotatably mounted in the end frame members 20 and 21. The stator plates of the three variable capacitors are secured to the end frame support members 20 and 21 and the rotor plates of the three variable capacitors are secured to the shaft 22. The front end frame member 20 which may be constituted of an insulating material, for example a plastic, comprises a generally planar member having four studs 23, 24, 25, 26 extending outward from the inside face thereof. The rear frame member 21 which may be also constituted of an insulating material such as plastic comprises a generally planar plate member and also has four studs 27, 28, 29 and 30 extending outward from the inside face thereof. Each of the studs 27, 28, 29 and 30 have a central portion adapted to receive the studs 23, 24, 25 and 26, respectively, of the front frame member. The end frame members 20 and 21 are secured in place by means of screws 31, 32, 33 and 34 extending through the rear end frame member 21 and each threadably secured to respective studs of the front frame member 20. A hole 35 is provided in the front frame member and a recess 36 is provided in the rear frame member 21 to receive and rotatably mount the shaft 22 therein. Two sets 40 and 41 of stator plates each consisting of the three plates 42, 43, 44 and 45, 46, 47, respectively are mounted on studs 23 and 24 extending from the front end frame member. Plates 44 and 45 of the two sets also form the stator plates of the third variable capacitor corresponding to capacitor 14 of FIGURE 1. Each of the stator plates has a pair of holes spaced so that they register with the studs 23 and 24 on the front frame member. The stator plates are stacked in parallel planes on the studs with the plates of set 40 stacked adjacent the front frame member as indicated. The plates of the first set are separated by conductive spacers. The plates of the second set 41, also separated by conductive spacers are stacked in parallel planes and located adjacent the rear frame member 21. A pair of insulating spacers 48 and 49 physically and conductively separate the first and second sets 40 and 41. The center plate 43 of the first set is provided with a tab 50 for making conductive connection thereto and the center plate 46 of the second set is also provided with a tab 51 for making conductive connection thereto.

The shaft 22 consists of a large diameter portion 52 and a small diameter portion 63. On the large diameter portion adjacent the small diameter portion thereof is provided a collar 54 adapted to bear up against the inside of the front frame member 20 to restrain movement of the shaft outward from the front frame member. A tab 55 is provided in between the front frame member 20 and the collar 54 to permit conductive connection to the shaft 22. On the reduced diameter portion 53 of the shaft are mounted a first set of three rotor plates 56, a composite rotor 57 and a second set of three rotor plates 58. The first set of rotor plates 56 is conductively mounted on the reduced diameter portion 53 of the shaft and are suitably spaced so as to interleave with the stator plates of the first set 40. The composite rotor 57 is mounted on the shaft 22 so as to be rotatably moveable in between the stator plates 44 and 45 of the first and second set and in insulating relationship therewith. The composite rotor element constitutes the rotor plate of coupling capacitor 14 of FIGURE 1 and will be more fully described in connection with FIGURES 5 and 6. The second set of rotor plates 58 is also conductively mounted on the reduced diameter portion 53 of the shaft and are suitably spaced so as to interleave with the stator plates of the first set 41. Reduced diameter portion 53 of the shaft 22 beyond the point of attachment of the second set of rotor plates may be threaded so as to permit securing of the rotor plate assemblies on the shaft, for example by nut and washer assembly 59. The shaft 22 is securely positioned in the inwardly direction by means of a recess 36 extending partially through the rear end frame member 21.

In the assembly of the composite variable capacitor structure the shaft may be first inserted in the opening 35 in the front frame member with the conducting tab 55 inserted between the frame member 20 and the collar 54 thereof. The rotor and stator plates, the insulating and conducting spacers may then be inserted in proper order on the shaft and on the stud members. The rotor members mounted on the shaft are secured in place by a nut and washer assembly 59 and the stator members on the stud are secured in place by fastening the rear end frame member 21 to the front and end frame members 20 by means of the screws 31, 32, 33 and 34. As the spacing of the rotor plates with respect to the stator plates is quite close a plurality of thin insulating spacers (not shown) may be provided in between adjacent rotor and stator surfaces to assure avoidance of direct contact as well as to provide an increase in the capacitance level of the varied capacitors, if desired.

Reference is now made to FIGURES 5 and 6 which illustrate the construction of the composite rotor element 57. The rotor element comprises a cylindrical insulating member 37 constituted of a suitable material such as plastic having a thickness relatively small in relation to its diameter. The rotor element also includes a first conductor 60 shaped generally in the form of a sector of a circle, and second and third conductors 61 and 62 planar in form shaped generally in the form of a sector of a circle. The first conductor has an apex angle which is a substantial portion of a circle and is located in a plane in between the bases of the insulating member 37 and may be secured thereto by imbedding therein. A portion of the conductor 60 near its apex has an opening 64 therein registering with an opening axially directed in the insulating member 37 for enabling the conductor 60 to be conductively secured to the shaft 22. The cylindrical member 37 may be counter sunk from both sides as shown to facilitate securing the member 37 to the shaft 22. The second and third conductors 61 and 62 are of substantially the same shape and are secured to the opposite bases of the insulating member 37 in opposed relationship and are further conductively connected, for example by strip 63 connecting adjacent parts of the second and third conductive members. The second and third conductors 61 and 62 extend over a different peripheral portion of the cylinder than does the first conductor 60. Opposed portions of the cylindrical member 59 lying on opposite sides of a portion of the conductive member as indicated for one side by outline 65 may be removed for the purpose of keeping the capacitance between plate 60 and plates 44 and 45 to a minimum when plate 60 extends therebetween.

Referring now to FIGURE 7 there is shown an exploded view in perspective of the rotor and stator plates of the three variable capacitors of the composite structure of FIGURE 2 and one set of conductive spacers 67, 68, 69 and 70 and one insulating spacer 48 for the stator plates. For reasons of clarity the shaft and other spacers are not shown. In this figure the elements identical to the elements of FIGURES 2, 3 and 4 are designated by the same numeral. The rotor plates of the variable capacitors are aligned for capacitance values of the three variable capacitors at the center of the high and low capacitance range, i.e., corresponding to channel 7 VHF operation in the circuit of FIGURE 1. It will be appreciated that the plates of the primary and secondary variable capacitors 12 and 13 are shaped to obtain the desired variation in capacitance as the shaft 22 is turned in the proper direction. When the shaft 22 is turned in the clockwise direction from the setting shown as viewed from the rear of the structure the capacitance of the primary and secondary capacitors decrease. When the shaft 22 is turned counterclockwise from the setting shown the capacitance increases. The composite rotor 57 is so aligned on the shaft that channel 7 capacitance is the capacitance between stator plates substantially unaffected by plate 60 on the rotor. As the rotor is moved in a clockwise direction the plate 60 which is conductively connected to the shaft 22 progressively shields more of the stator plate 44 from the stator plate 45 thereby decreasing the capacitance therebetween. When the rotor is moved counterclockwise the conductors 61 and 62 are brought into the volume defined by the stator plates 44 and 45 thereby providing a pair of serially connected variable capacitances. As the spacing of the plates of the serially connected capacitors are much closer than the spacing of the plates 44 and 45 higher capacitance is achieved. The conductor plates 61 and 62 are contoured to provide the desired variation of capacitance with the motion of the shaft.

The foregoing description will be more fully understood by considering the equivalent circuits of FIGURES 8 and 9. FIGURE 8 shows the equivalent circuit for the three variable capacitors for operation over the low capacitance range thereof, or the high range of VHF frequencies, channels 7 through 13. In this figure the elements identical with elements of FIGURE 1 have the same numerical designations. Capacitance 12 represents the capacitance between the first set of stator plates 40 and the first set of rotor plates 56. Capacitance 13 represents the capacitance between the second set of stator plates and the second set of rotor plates 58. In the upper VHF range of operation a capacitance exists between the stator plate 44 and the rotor plate 60 and is designated capacitance 71 in dotted outline in shunt with the primary capacitance 12. Similarly a capacitance exists between stator plate 45 and the rotor plate 60 and is designated capacitance 72 in dotted outline in shunt with the secondary capacitance 13. These capacitances are small in relation to the primary and secondary capacitances and consequently do not appreciably affect the values of the primary capacitor and secondary capacitance; however, the design of the primary and secondary capacitances may allow for such additional variable capacitance. The variation of capacitance in element 14 is achieved by introducing a shield 60 between stator plates 44 and 45 thereby progressively reducing the capacitance coupling between the stator plates 44 and 45.

FIGURE 9 shows the equivalent circuit for the three variable capacitors for operation over the high capacitance range or low range of VHF frequencies, channels 2 through 6. In this figure the elements identical with elements of FIGURE 1 have the same numerical designations. Capacitance 12 represents the capacitance between the first set of stator plates 40 and the first set of rotor plates 56. Capacitance 13 represents the capacitance between the second set of stator plates and the second set of rotor plates 58. The serially connected capacitances 73 and 74 represent capacitances between plate 44 and plate 62 and between plate 61 and 45 respectively, corresponding to capacitance 14 of FIGURE 1. The capacitance 75 shown in dotted outline represents a small amount of stray capacitance between conductors 61 and 62 and shaft 22.

Referring now to FIGURES 10 and 11, there is shown another composite rotor 80 in accordance with another aspect of the invention. Such rotor may be substituted for the rotor of FIGURES 5 and 6 in the structure of FIGURES 2, 3 and 4 to provide another composite variable capacitor assembly for achieving the desired variation in coupling capacitance as well as the desired variation in primary and secondary capacitances of the circuit of FIGURE 1. This structure comprises a cylindrically shaped insulating member 81 having arcuate sector thereof removed and having a pair of conductive plates 82 and 83 conductively connected together and disposed on the opposed portions of the bases of member 81, similar to the conductive plates 61 and 62 of FIGURES 5 and 6. The right half of the structures as viewed in FIGURE 1 is useful in achieving the capacitance variation for operation on channels 7 through 13. The left half of the structure as viewed in FIGURE 10 is useful in achieving the variation in capacitance for operation on channels 2 through 6.

Referring now to FIGURE 12 there is shown an exploded view in perspective of the rotor and stator plates of the three variable capacitors of the composite structure of FIGURE 2 and one set of conductive spacers 67, 68, 69 and 70 and one insulating spacer 48 for the stator plates. For reasons of clarity the shaft and other spacers are not shown. In this figure the elements identical to the elements of FIGURE 2 are designated by the same numeral. The rotor plates of the variable capacitors are aligned for capacitance values of the three variable capacitors at the low end of the low capacitance range, i.e., corresponding to channel 13 VHF operation in the circuit of FIGURE 1. It will be appreciated that the plates of the primary and secondary variable capacitors 12 and 13 are so shaped to obtain the desired variation in capacitance as the shaft 22 is turned in the proper direction. When the shaft 22 is turned in the counterclockwise direction from the position indicated the capacitance of the primary and secondary capacitors increase and also the coupling capacitance 14 increases. The composite rotor 80 is so aligned on the shaft that on the channel 13 position with the cut away portion 9 of the cylinder 81 between plates 44 and 45 the capacitance between stator plates 44 and 45 is essentially unaffected by the rotor. As the rotor is moved in a counterclockwise direction increasing amount of dielectric is brought into the volume defined by the plates 44 and 45 thereby increasing the capacitance between the plates 44 and 45. When the rotor plate is moved to the position where the conductors 82 and 83 are brought into the volume defined by the stator plates 44 and 45, a pair of serially connected variable capacitances are formed. As the spacing of the plates of serially connected capacitor are much closer than the spacing of the plates 44 and 45 high capacitance is achieved. The conductor plates 82 and 83 are contoured to provide the desired variation of capacitance with the motion of the shaft.

The foregoing description will be more fully understood by considering the equivalent circuits of FIGURES 13 and 9. FIGURE 13 shows the equivalent circuit for the three variable capacitors for operation over low capacitance range or the high range of VHF frequencies, channels 7 through 13 on low range of capacitances. In this figure capacitor elements identical with elements of FIGURE 1 have the same numerical designations. In the upper VHF range of operation the capacitance between stator plate 44 and stator plate 45 constitutes capacitance 14. The capacitance is increased by introducing more of dielectric cylinder 81 in the space between the plates. As the structure for operation in the high capacitance range of the variable capacitor 14 is the same as for the structure of FIGURES 5 and 6, the equivalent circuit is the same and is shown in FIGURE 9.

The foregoing is a description of illustrative embodiments of the invention, and it is applicant's intention in the appended claims to cover all forms which fall within the scope of the invention.

What I claim as new and desire to secure by Letters Patent of the United States is:

1. A variable capacitor comprising:
a pair of conductive planar members having adjacent surfaces spaced in opposed relationship,
a third planar member located adjacent said surfaces, said planar member being a composite member having a pair of conductive portions on opposed faces thereof and conductively connected, and a third conductive portion spaced in between the faces of said pair of planar members and in insulated relationship with respect to said pair of conductive portions, said third portion occupying a different portion of said third planar member than either of said first and second conductive portions,
means for moving said planar member in relation to the space between said pair of planar members to sequentially bring said conductive portions and said third conductive portion in spaced relation to said surfaces to produce a variation of the capacitance between said pair of planar members.

2. A variable capacitor comprising:
a pair of conductive plates having adjacent faces located in substantially parallel planes separated by a predetermined distance,
a shaft adjacent said plates and having its axis generally perpendicular to the planes of said plates,
a third plate located between said plates with its major opposed surfaces in planes parallel to the said adjacent faces and fixedly mounted on said shaft,
said third plate being a cylinder of height relatively small in relation to the diameter thereof and of insulating material having a pair of conductive portions conductively connected on opposed bases thereof and conductively connected, a sector of said cylinder being contoured so that the radial distances of successive points on the periphery thereof are successively greater,
means for rotating said shaft, whereby a variation of the capacitance between said pair of conductive plates is produced.

3. A variable capacitor comprising:
a pair of conductive planar members having adjacent surfaces spaced in opposed relationship,
a third planar member located adjacent said surfaces,
said third planar member including a pair of conductive portions located on opposite faces thereof and conductively connected, said conductive portions being generally in the form of segments having progressively greater widths from one end to the other end thereof, and
means for moving said third planar member in relation to the space between said pair of planar members to cause a variation of the capacitance between said pair of planar members.

4. The variable capacitor as recited in claim 3 wherein said third planar member includes a third conductive portion in insulator relationship with respect to said pair of conductive portions.

5. The variable capacitor of claim 4 wherein said third planar member is a cylinder of height relatively small in relation to the diameter thereof and of insulating material having said pair of conductive portions on opposed bases thereof, and said third conductive portion embedded between the bases of said cylinder and in insulated relationship with respect to said pair of conductive portions, said third portion occupying a different sector of the axis of said cylinder than either said first and second conductive portions, said cylinder having openings to expose substantial portions of both surfaces of said third conductive portion.

References Cited

UNITED STATES PATENTS 2,764,674  9/1956  Barton _____ 317—254 X

FOREIGN PATENTS 536,831  2/1957  Canada.
352,706  7/1931  Great Britain.

LARAMIE E. ASKIN, *Primary Examiner.*

E. GOLDBERG, *Assistant Examiner.*